(12) United States Patent
Sobel et al.

(10) Patent No.: US 7,802,134 B1
(45) Date of Patent: Sep. 21, 2010

(54) RESTORATION OF BACKED UP DATA BY RESTORING INCREMENTAL BACKUP(S) IN REVERSE CHRONOLOGICAL ORDER

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1434 days.

(21) Appl. No.: 11/206,896

(22) Filed: Aug. 18, 2005

(51) Int. Cl.
*G06F 11/00* (2006.01)
(52) U.S. Cl. .......................... 714/15; 709/253
(58) Field of Classification Search .............. 714/15
See application file for complete search history.

(56) References Cited

U.S. PATENT DOCUMENTS

| | | | |
|---|---|---|---|
| 5,720,026 A * | 2/1998 | Uemura et al. ............. | 714/6 |
| 6,038,379 A * | 3/2000 | Fletcher et al. ............ | 709/230 |
| 6,073,128 A * | 6/2000 | Pongracz et al. ........... | 707/3 |
| 7,178,053 B2 * | 2/2007 | Ho ............................. | 714/5 |
| 7,254,596 B2 * | 8/2007 | De Spiegeleer ............ | 707/204 |
| 2004/0019705 A1 * | 1/2004 | Ogura ........................ | 709/253 |
| 2004/0139128 A1 * | 7/2004 | Becker et al. .............. | 707/204 |
| 2005/0114403 A1 * | 5/2005 | Atchison .................... | 707/200 |
| 2005/0177767 A1 * | 8/2005 | Furuya et al. .............. | 714/13 |
| 2005/0240813 A1 * | 10/2005 | Okada et al. ................ | 714/14 |
| 2005/0246398 A1 * | 11/2005 | Barzilai et al. ............. | 707/204 |
| 2006/0218435 A1 * | 9/2006 | van Ingen et al. .......... | 714/6 |

* cited by examiner

*Primary Examiner*—Scott T Baderman
*Assistant Examiner*—Kamini Patel
(74) *Attorney, Agent, or Firm*—Advantedge Law Group

(57) ABSTRACT

Restoring of content of data blocks to non-volatile storage as the content existed at a particular instant in time. After accessing the last backup representing the most recent backup of the plurality of data blocks prior to the particular instant in time, the content of each data block represented in the last backup is written to a corresponding position in the non-volatile storage. This last backup may be an incremental backup in which only those data blocks that had changed since the immediate prior backup were actually backed up. Then, restoration occurs through each prior backup in reverse chronologic order until the full backup is encountered and restored. When restoring a backup, a data block is not restored if the data block had already been restored proceeding in reverse chronological order.

39 Claims, 5 Drawing Sheets

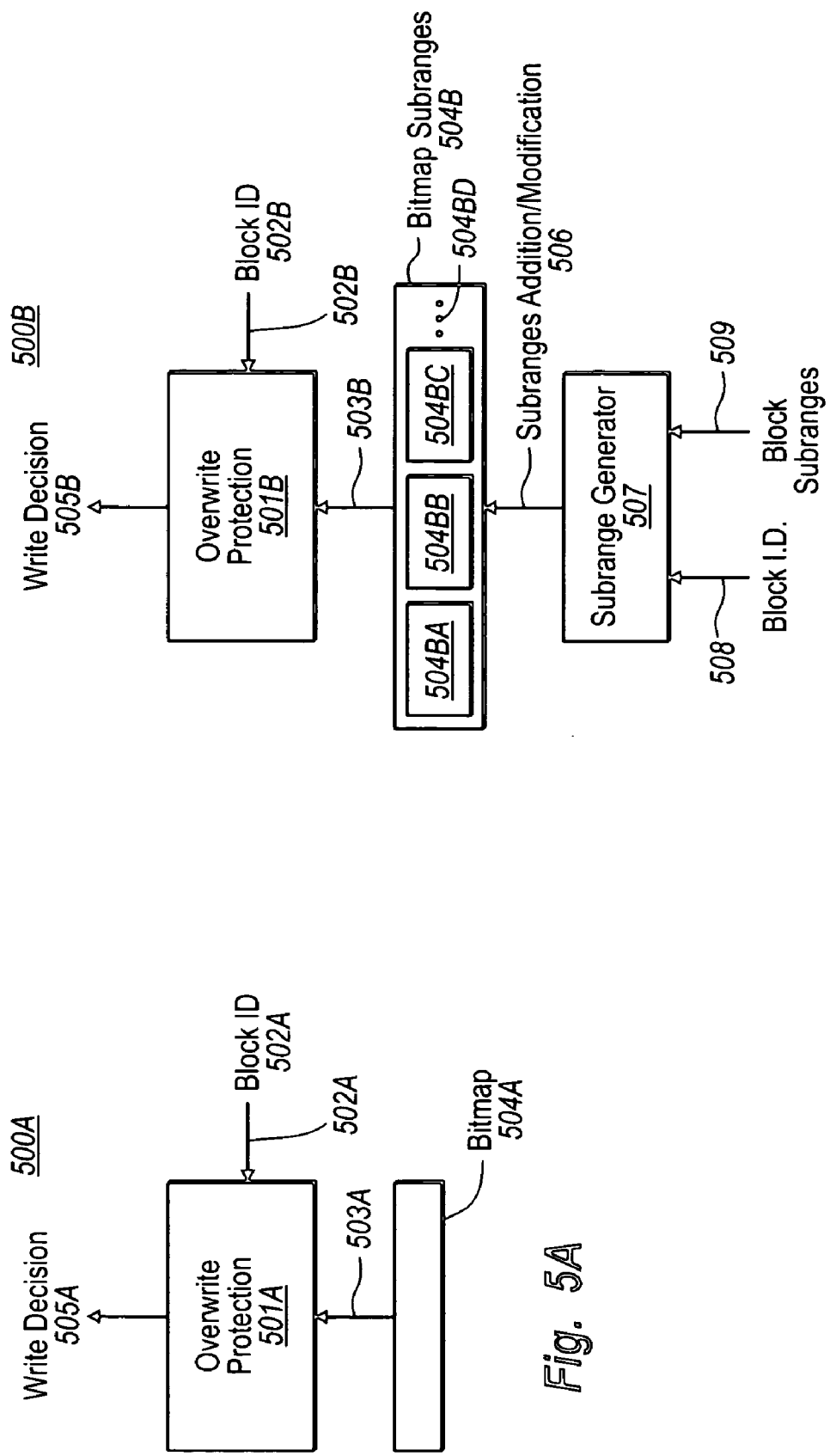

RESTORATION OF BACKED UP DATA BY RESTORING INCREMENTAL BACKUP(S) IN REVERSE CHRONOLOGICAL ORDER

BACKGROUND OF THE INVENTION

Computing technology has transformed the way we work and play. Businesses, residences, and other enterprises have come to rely on computing systems to manage their key operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data as the active data existed at a previous instant in time. The backup copy of the data is periodically updated. More frequent updates tend to increase the freshness of the data at the backup computing system.

In order provide such a backup copy to the backup computing system, resources associated with the channel between the primary and backup computing systems are used. For example, when the primary and backup computing systems are located across a network, network bandwidth and other resources are consumed. Even if the primary and backup computing systems are located on the same machine, disk access time and processing resources are expended.

In order to reduce the channel resources expended in order to transfer the backup copy, incremental backup technology is employed. Initially, a full backup is performed such that the backed up memory blocks on the backup computing system have the same content as the corresponding primary memory blocks on the primary computing system. Moving forward from the time of the last backup, the primary computing system may continue to operate on the primary data. As this happens, the content of certain memory blocks (e.g., disk sectors or clusters) on the primary computing system may change due to writes to such memory blocks. During a subsequent incremental backup operation, only the content for the associated primary memory blocks that have changed since the time of the last backup operation are transferred to the backup computing system.

Once the next incremental backup is completed, if the next backup is to be an incremental backup, the changes since the last incremental backup are once again identified, and then only those memory blocks that have changed are sent to the backup computing system in the next backup. A single full backup may thus have multiple subsequent incremental backups. A common configuration is to create the full (also called "baseline") backup at some interval (e.g. weekly) with incremental backups at smaller intervals (e.g. daily) between the full backups.

When it comes time to do a restore, the restoration is often done in forward chronological order starting with the last full backup. Specifically, the last full backup is accessed by the primary computing system (or any computing system being restored to), and all of the sectors are written back to the disk. Then, the first incremental backup after the last full backup is accessed, and those sectors are written to the disk. This repeats for all subsequent backups until the final incremental backup before the time being restored to.

Some sectors repeatedly change. For example, the Master File Table (MFT) in the NT File System (NTFS) frequently changes. These changed sectors often show up in every incremental backup. Thus, a forward chronological restore often results in multiple writes to the same sector. This can take additional restoration time. Furthermore, some non-volatile storage has a useful lifetime that is measured in number of writes. Accordingly, unnecessary writes may reduce the operating lifetime of the non-volatile memory being restored to. An example of such non-volatile storage is FLASH memory.

BRIEF SUMMARY OF THE INVENTION

The principles of the present invention are directed towards the restoring of data blocks to non-volatile storage as the content existed at a particular instant in time. After accessing the last incremental backup representing the most recent incremental backup of the plurality of data blocks prior to the particular instant in time, the content of each data block represented in the last incremental backup is written to a corresponding position in the non-volatile storage. Then, restoration occurs through each prior incremental backup in reverse chronologic order until the full backup is encountered and restored. When restoring a backup, a data block is not restored if the data block had already been restored proceeding in reverse chronological order.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5A illustrates a schematic diagram of a mechanism for implementing overwrite protection when restoring incremental backups in reverse chronological order in accordance with a first embodiment of the present invention; and FIG. 5B illustrates a schematic diagram of a mechanism for implementing overwrite protection using subranges when restoring incremental backups in reverse chronological order in accordance with a second embodiment of the present invention.

DETAILED DESCRIPTION OF THE PREFERRED EMBODIMENTS

The principles of the present invention relate to the restoration of incrementally backed-up content of data blocks to non-volatile storage in reverse chronological order. First, a general computing system will be described with respect to FIG. 1, as being a suitable computing system that may be used to practice the principles of the present invention. Then, the principles of the present invention will be described with respect to FIGS. 2, 3, 4, 5A and 5B.

Figure 1:
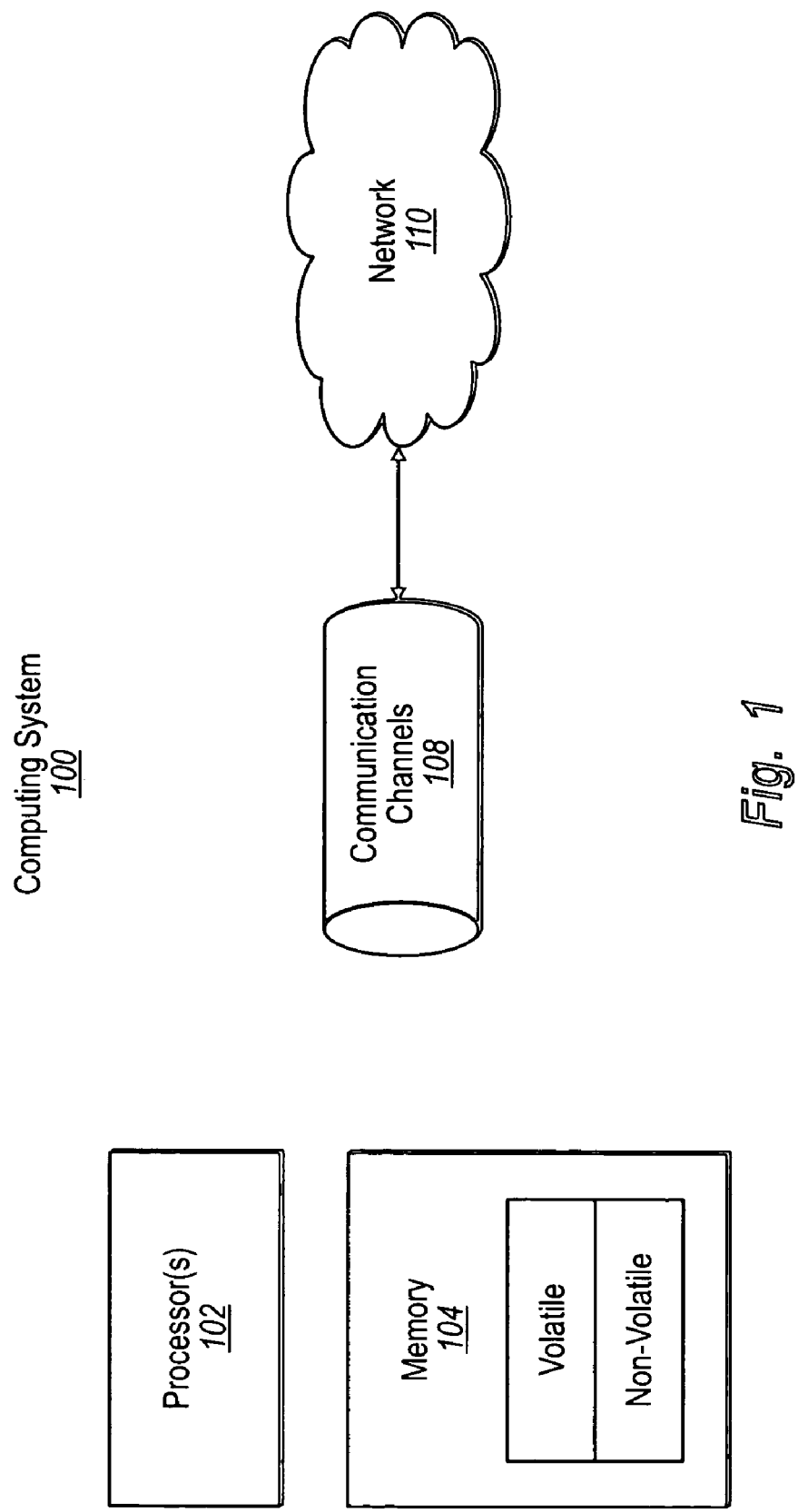
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
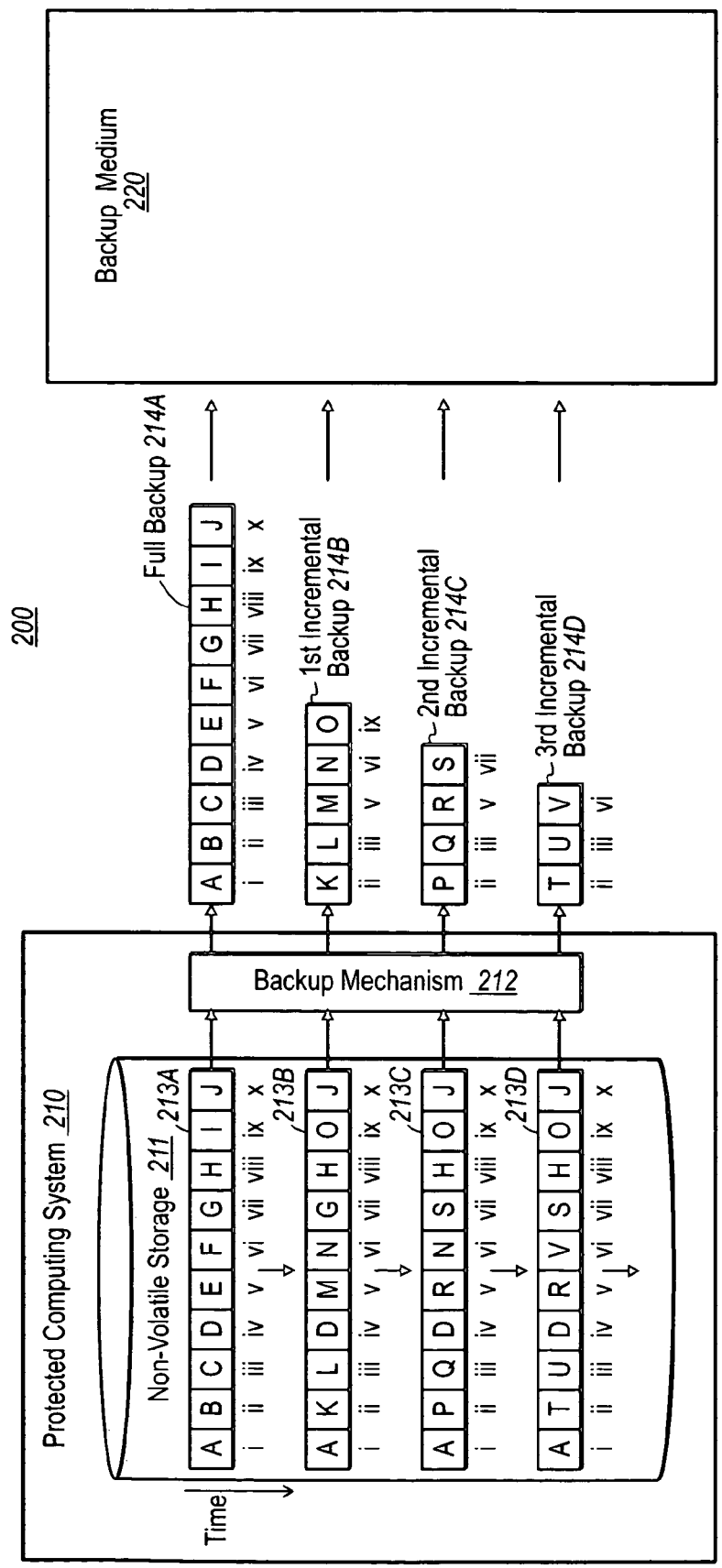
FIG. 2 illustrates a backup environment in which the principles of the present invention may be employed including a schematic illustration of a full backup followed by three incremental backups made in forward chronological order.

FIG. 2 illustrates a backup environment 200 in which the principles of the present may be employed. The backup environment 200 includes a protected computing system 210 having non-volatile storage 211 that includes multiple data blocks that are to be backed up to a backup medium 220. The protected computing system 210 may, but need not, be structured as described above for the computing system 100 of FIG. 1. The backup medium 220 may, but need not, be associated with a backup computing system. For example, the backup entity may be a hard drive that is connected to the protected computing system 210 at least during the times that backups are occurring to the backup entity. However, the backup entity may also be located across a network. In that case, the backup entity may be associated with a backup computing entity that serves one or more protected computing systems distributed over a network. If associated with a backup computing system, the backup computing system may also be structured as described above for computing system 100 of FIG. 1, although not required.

The protected computing system 210 includes a backup mechanism 212 that generates backups for sending to the backup medium 220. This may be accomplished by sending a full backup that includes the current state for all of the data blocks to be protected, followed by one or more incremental backups that each include only the content of the data blocks that have changed since the last backup. The data blocks may be, for example, sectors or clusters if the non-volatile storage 211 were a disk drive. However, the size and nature of the data blocks will depend on the type of non-volatile storage.

In FIG. 2, there are ten data blocks shown occupying positions labeled from left to right i, ii, iii, iv, v, vi, vii, viii, ix and x. The number of data blocks to be protected may well exceed ten. For instance, if the data blocks were each sectors of size 4 kilobytes, and an entire volume of 60 gigabytes was to be protected, there would be approximately 15 million data blocks to be protected. However, this example is limited to just 10 blocks in order to explain more clearly the principles of the present invention.

The content of each data block is symbolized by a capital letter (e.g., capital letters "A" though "V"). The capital letters symbolically represent content of the data block. Where two data blocks have different associated capital letters, this means that the content of the data blocks is different. The example illustrates the ten different data blocks at four different instances in time, where time is symbolically proceeding forward as one proceeds downward in FIG. 2.

The upper ten data blocks 213A have the earliest illustrated state with content A, B, C, D, E, F, G, H, I and J corresponding to positions i though x, respectively. The backup mechanism 212 captures the state of the data blocks 213A in the form of a full backup 214A, and provides the full backup 214A to the backup medium 220. In the case of a full backup, the state of all of the data blocks are captured and provided to the backup medium 220. Mechanisms for capturing a snapshot of the state of protected data blocks as that state existed at an instant in time are well known in the art. The principles of the present invention are not limited to any particular mechanism for capturing the state of the protected blocks.

After the full backup 214A is captured, the protected computing system 210 continues to operate upon the live state of the protected data blocks. In the example of FIG. 2, the data blocks at positions ii, iii, v, vi and ix are altered to have content K, L, M, N and O to reach state 213B. At that point, a first incremental snapshot of the state 213B may be taken, and only those data blocks that have changed are compiled into a first incremental snapshot 214B, that is provided to the backup medium 220.

After the first incremental backup 214B is captured, the data blocks at positions ii, iii, v and vii are altered to have content P, Q, R and S to reach state 213C. At that point, a second incremental snapshot of the state 213C may be taken, and the changed data blocks are compiled into a second incremental snapshot 214C, which is provided to the backup medium 220.

After the second incremental backup 214C is captured, the data blocks at positions ii, iii and vi are altered to have content T, U and V to reach state 213D. At that point, a third incremental snapshot of the state 213D may be taken, and the changed data blocks are compiled into a third incremental snapshot 214D, which is provided to the backup medium 220.

Conventional restore operations often occur in a chronological order. First, the full backup is restored and written to the corresponding protected blocks on the non-volatile storage. Then the data blocks included in the first incremental backup are written to the respective positions in the non-volatile storage. Then, the data blocks included in the second incremental backup, if any are written to the respective positions in the non-volatile storage. This restoration process of the incremental backups is repeated moving forward in time, until the final incremental backup prior to the time to be recovered to is written to the non-volatile storage.

Referring to the example backups of FIG. 2, this forward chronological restore would result in often several writes to the same data block. For instance, data block ii would first have content B on the first write resulting from the restoration of the full backup 214A. Then, content K would be written to date block ii due to the restoration of the first incremental backup 214B. Content P would then be written to data block ii due to the restoration of the second incremental backup 214C. Finally, content T would be written to data block ii due to the restoration of the third incremental backup 214D. All these writes occur despite the fact that content T is the only content that would result in the data block ii truly being restored.

Similarly, data block iii would also take four writes (first C, then L, then Q, then U). Data block v would take three writes (first E, then M, then R). Data block vi would take three writes (first F, then N, then V). Data block vii would take two writes (first G, then S). Data block ix would take two writes (first I, then O). This type of situation may realistically occur in real life since a given file may often frequently change. For instance, housekeeping records (such as the Master File Table or "MFT") of a file system (e.g., the NTFS file system) are often changed repeatedly. The principles of the present invention allow restoration of a full backup and one or more incremental backups to occur with potentially just one write per data block, even for those data blocks that changed from the time the full backup was taken.

Figure 3:
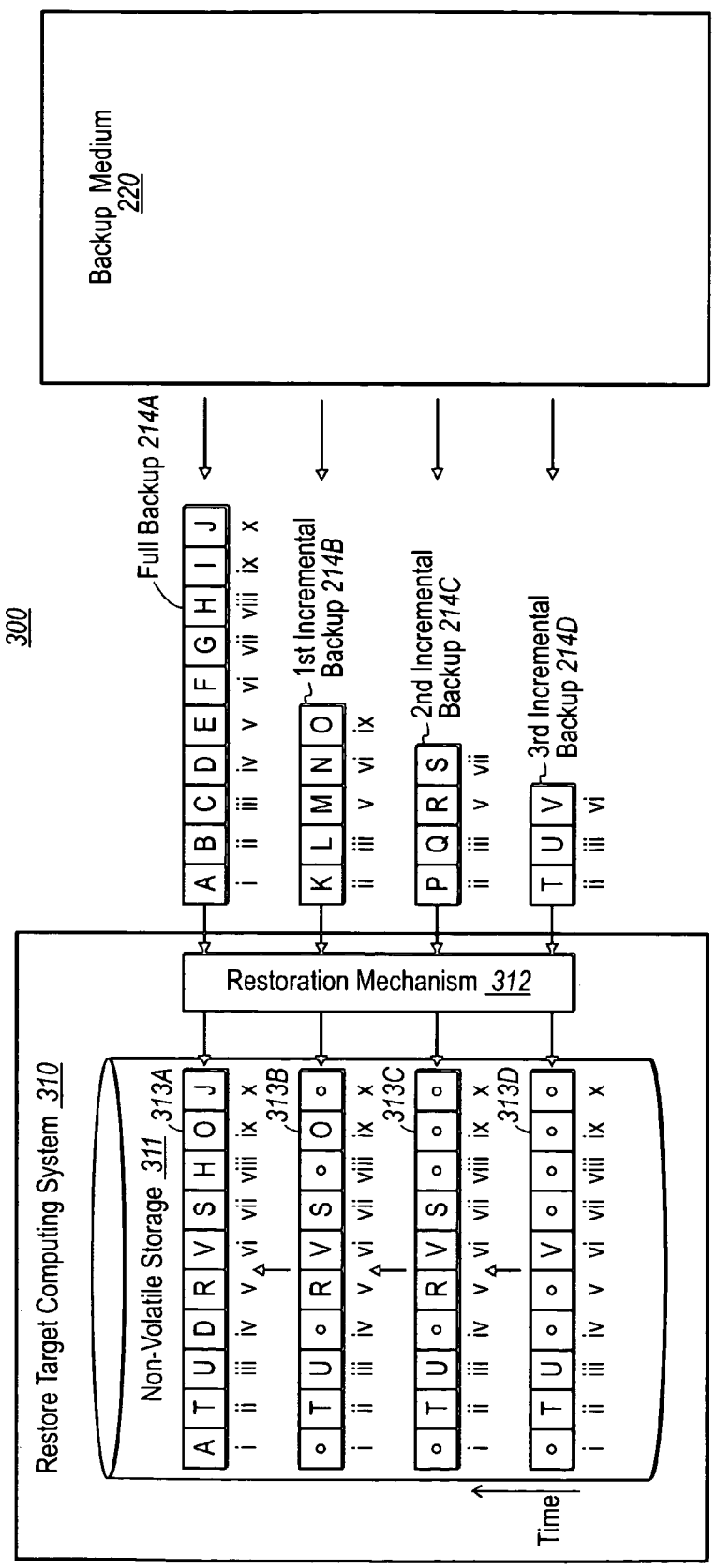
FIG. 3 illustrates a restoration environment in which the principles of the present invention may be employed including a schematic illustration of a restoration in reverse chronological order starting with the latest incremental backup and ending at the corresponding last full backup.

FIG. 3 illustrates a restoration environment 300 that includes a restore target computing system 310, and the backup medium 220. The restore target computing system 310 may, but need not, be the same as the protected computing system 210 of FIG. 2. The restore target computing system 310 includes a non-volatile storage 311 that the data blocks are to be restored to. The restoration mechanism 312 manages restoration consistent with the principles of the present invention as will be described hereinafter. The restoration mechanism 312 may implement some or all of the functionality described herein exclusively using hardware, or may perhaps implement the functionality partially or fully in software. Any software implemented functionality may be performed by one or more modules that are instantiated in memory, and that operate to perform the functions described herein when executing computer-executable instructions using one or more processors of the restore computing system 310. The illustrated restoration of FIG. 3 is consistent with the illustrated backup of FIG. 2 in that the same full backup 214A, and incremental backups 214B, 214C and 214D as were previously backed up are now restored in the example.

Figure 4:
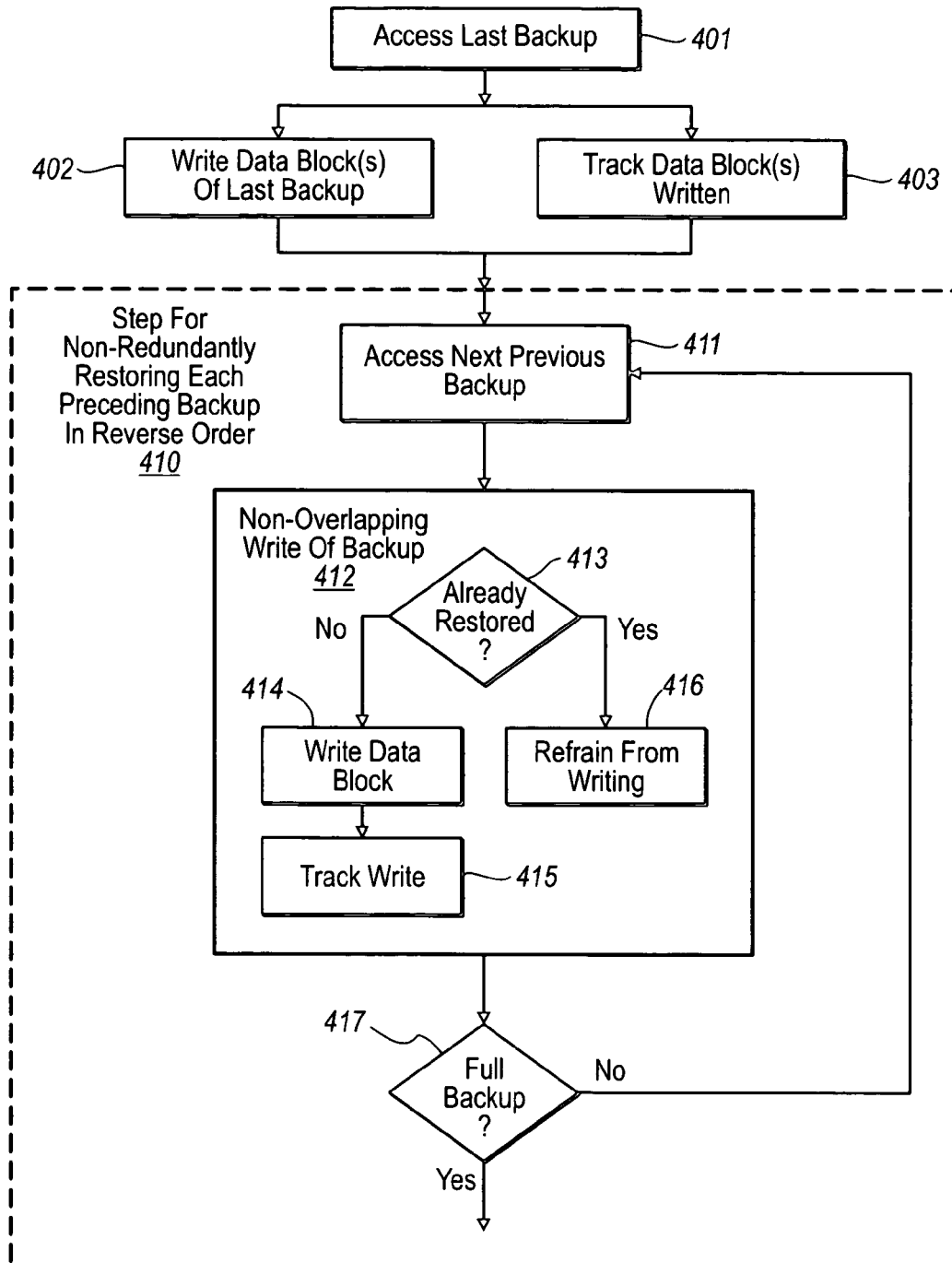
FIG. 4 illustrates a flowchart of a method for restoring incrementally preserved content of data blocks in reverse chronological order in accordance with the principles of the present invention.

FIG. 4 illustrates a method 400 for restoring content of data blocks to non-volatile storage as the content existed at a particular instant in time in accordance with the principles of the present invention. In the example, the ten protected data blocks having state 213D (corresponding to the time that the final incremental snapshot was taken) is to be restored. As the method 400 of FIG. 4 may be performed in the environment 300 of FIG. 3, and with the example data blocks of FIG. 3, the restoration method 400 of FIG. 4 will be described with frequent reference to the environment 300 of FIG. 3.

Referring to FIG. 4, the restoration mechanism accesses the last backup representing the most recent backup of the protected data blocks prior to the particular instant in time (act 401). For instance, referring to FIG. 3, the restoration mechanism 312 accesses the third incremental backup 214D, which was the last backup prior to the instant in time being restored to.

Back to FIG. 4, the restoration mechanism then writes the content of each data block represented in the last backup to a corresponding position in the non-volatile storage (act 402). Referring to FIG. 3, the restoration mechanism writes the content T, U and V corresponding to positions ii, iii and vi, to the respective positions on the non-volatile storage 311. The result is state 313D, in which three data blocks are restored, and seven are yet to be restored. Data blocks that are not yet restored in the non-volatile storage 311 are illustrated with a dot to symbolize that their content cannot yet be relied upon as accurate.

Referring to FIG. 4, the restoration mechanism tracks the data blocks that have already been restored (act 403). This may be accomplished using, for example, a bitmap, in which a set bit indicates that the corresponding data block has been restored, and a clear bit indicates that the corresponding data block has not yet been restored. For instance, a bitmap 0110010000 could represent that the positions ii, iii, and vi are restored.

The restoration mechanism 312 may then perform a functional, result-oriented step for non-redundantly restoring each preceding backup in reverse chronological order until the corresponding full backup is restored (step 410). This may be accomplished using any combination of acts that would accomplish this result. However, in the illustrated embodiment, this is accomplished using acts 411 through 417, which may be repeated for each backup in reverse chronological order until the acts are performed for the full backup.

Specifically, the restoration mechanism may access the next previous backup of the protected data blocks (act 411). The previous backup may be accessed at any time, even before the last backup is accessed (act 401) if so desired. The principles of the present invention are not limited to when any of the previous backups are accessed. In the illustrated flowchart of FIG. 4, however, the backups are accessed as they are restored. Referring to FIG. 3, for example, the restoration mechanism 312 access the second incremental backup 214C that includes content P, Q, R, and S corresponding to positions ii, iii, v and vii.

Referring to FIG. 4, the restoration mechanism then performs a non-overlapping write of the backup (act 412). For instance, referring to FIG. 3, the restoration mechanism 312 performs a non-overlapping write of the second incremental backup 214C to the non-volatile storage 311.

A "non-overlapping write" means that for each data block that has already been restored (Yes in decision block 413), the data block is kept from being written to the corresponding data block in the non-volatile storage (act 416). Furthermore, for each data block that has not yet been restored (No in decision block 413), the data block is written to the corresponding position in the non-volatile storage (act 414). For instance, in FIG. 3, since the positions ii and iii of the non-volatile storage 311 have already been written to (e.g., when restoring the third incremental backup 214D), the content P from position ii, and the content Q from position iii in the second incremental backup 214C are not written to respectively positions ii and iii of the non-volatile storage 311. However, since the positions v and vii of the non-volatile storage 311 has not yet been written to, the content R and S from positions v and vii of the second incremental backup 214C are written to the respective positions v and vii of the non-volatile storage 311 resulting in state 313C. Now five data blocks are restored, and five data blocks remain unrestored in the example.

The determination of whether or not the data block has been written to may be accomplished by referring to the result of the tracking mentioned for act 403. For instance, the bitmap 0110010000 may be referred to which indicates that the data blocks at positions ii, iii and vi have been previously restored, but the others have not. So that this determination can be made for the next backups to be restored, the writes for the current backup being restored may be tracked as well (act 415). For instance, when restoring the second incremental backup 214C, the data blocks at positions v and vii were written to thus changing the bitmap from 0110010000 to 0110111000. Since the second incremental backup 214C was not the full backup 214A (No in decision block 417), the process repeats for the next previous backup.

For instance, after accessing the first incremental backup 214B, the restoration mechanism 312 performs a non-overlapping write of the content of the data blocks in the first incremental backup 214B to the non-volatile storage 311. Specifically, since positions ii, iii, v, and vi have been previously written to (positions ii, iii, and vi in the restoration of the third incremental backup 214D, and position v in the restoration of the second incremental backup 214C), the content K, L, M and N from positions ii, iii, v and vi of the first incremental backup 214B are not written to the non-volatile storage 311. However, since position ix has not been previously written to as part of the restore, the content O is written to position ix of the non-volatile storage 311. Now six data blocks are restored, and four data blocks remain unrestored. The bitmap may be modified from 0110111000 to 0110111010 to reflect the write to position ix. Since the first incremental backup 214B was not the full backup 214A (No in decision block 417), the process repeats for the next previous backup.

For instance, after accessing the full backup 214A, the restoration mechanism 312 performs a non-overlapping write of the content of the data blocks in the full backup 214A to the non-volatile storage 311. Specifically, since positions ii, iii, v, vi, vii and ix have been previously written to (positions ii, iii, and vi in the restoration of the third incremental backup 214D, positions v and vii in the restoration of the second incremental backup 214C, and position ix in the restoration of the first incremental backup 214B), the content B, C, E, F, G, and I from positions ii, iii, v, vi, vii, and ix of the full backup 214A are not written to the non-volatile storage 311. However, the content A, D, H, and J are written to positions i, iv, viii, and x of the non-volatile storage 311 since those data blocks had not been previously written to as part of the restore. The bitmap need not be further modified since this was the final act of the restoration resulting in state 313A, which is identical to state 213D of the protected backups prior to the instant in time being restored to.

The principles of the present invention may potentially significantly reduce the number of writes needed in order to perform a restore from a full backup and one or more subsequent incremental backups, since the restoration is performed in reverse chronological order and since the content of later backups is preserved by performing non-overlapping writes using overlap protection.

FIG. 5A illustrates a schematic 500A for implementing overwrite protection using a full bitmap as described above. The overwrite protection module 501A (which may be hardware and/or software) accesses 503A the full bitmap 504A representing which data blocks have already been written to as part of the restore. The overwrite protection module 502A also received the position of the block 502A at issue as to whether or not that block has been written to. The overwrite protection module 501A may then output a write decision 505A indicating whether or not to write the data block at the position 502A.

In the example above, there were only ten protected data blocks. However, depending on the size of the protected non-volatile storage, and the size of the data blocks, the bitmap may be quite large. There may, in fact, be insufficient memory to perform processing with such a large bitmap. In that case, the principles of the present invention may still be applied to perform the restore in reverse chronological order. If there is not enough memory to represent all a full bitmap, efficiency can be gained by using however much memory is available to track as many block modifications as the memory allows. The restore process then may proceed as described above until the modified block bitmap is full. At this point, the technique may revert to the standard of applying the baseline full backup image followed in chronological order by the remaining incremental images. However, as this is done, the bitmap of modified blocks is still consulted so that none of the represented blocks is overwritten during this chronological restore process.

In order to reduce the size of the bitmap, the bitmap may instead be represented with one or more subranges. The subranges may each include a starting position, and may represent a bitmap for contiguous positions beginning with that starting position. Referring to FIG. 5B, a schematic 500B may be used to determine whether or not a block has been previously written to based on these subranges. For instance, the subranges 504B may include subranges 504BA, 504BB, 504BC amongst others as represented by the ellipses 504BD. The overwrite protection module 501B accesses 503B the subranges 504B to make the write decision 505B regarding whether or not to write the content of the block represented by position 502B to the non-volatile storage.

For instance, the overwrite protection module 501B may first determine whether or not the position is represented at all in any of the subranges. If the position is not represented, then it is not a block that has been previously written to, and the decision is then to write to the corresponding position. In that case, the subranges 504B would be modified by a subrange generator component 507, which would also receive the block position 508, and determine which subrange(s) to modify, or whether to add one or more new subranges to represent the new position. On the contrary, if the position is represented by the subrange(s), the overwrite protection module 501B checks to determine whether or not the corresponding bit is set (indicating that a write to that position has previously been made) or clear (indicating that a write to that position has not been previously made), and makes the write decision based on that determination.

The subrange generator module 507 may generate the subranges using subrange addition/modification instructions 506 by continuously modifying and/or adding new subranges as new positions are discovered to be represented in the incremental backups. This may be performed at the time the restore is actually occurring at the restore target computing system or at the backup computing system at or before the time that the backups are provided back to the restore target computing system. Alternatively or in addition, the protected computing system may generate subrange bitmap(s) for each incremental image. The subrange generator 507 may receive the subrange bitmap(s) for each incremental image (represented by arrow 509), and generate the appropriate subrange bitmap(s) for all of the incremental backups based on the subrange bitmap(s) for each incremental image. This may involve appropriate merging of subranges if two neighboring subranges overlap.

Even with this reduced bitmap size, if there is insufficient memory to represent all of the subranges, the principles of the present invention may still be used to perform the restore in reverse chronological order as far as memory permits, and then revert to forward chronological restore with appropriate write protection for those data blocks that had already been restored during the reverse chronological restore.

Accordingly, the principles of the present invention allow an efficient mechanism for restoring protected data blocks represented by a full backup and one or more incremental backups. Even if the data blocks changed frequently between backups, the restore is accomplished by using potentially even just one write per data block being restored.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for restoring content of a plurality of data blocks to non-volatile storage as the content existed at a particular instant in time, the method comprising:

an act of accessing a last backup representing the most recent backup of the plurality of data blocks prior to the particular instant in time;

an act of writing the content of each data block represented in the last backup to a corresponding position in the non-volatile storage;

an act of accessing a second-to-last backup representing the second most recent backup of at least a portion of the plurality of data blocks prior to the particular instant in time; and after the act of writing the content of each data block represented in the last backup, an act of performing a non-overlapping write of the second-to-last backup by performing the following:

for each of at least one data block that is represented in the second-to-last backup, but is not represented in the last backup, an act of writing the data block of the second-to-last backup to the non-volatile storage; and for each of at least one data block that is represented in the second-to-last backup, and is also represented in the last backup, an act of refraining from writing the data block of the second-to-last backup.

2. A method in accordance with claim 1, wherein the last backup is an incremental backup, and the second to last backup is also an incremental backup of the plurality of data blocks.

3. A method in accordance with claim 1, wherein the last backup is an incremental backup, and the second-to-last backup is a full backup of the plurality of data blocks.

4. A method in accordance with claim 1, further comprising the following:

an act of accessing a third-to-last backup representing the third most recent backup of at least a portion of the plurality of data blocks prior to the particular instance in time; and after the act of performing a non-overlapping write of the second-to-last backup, an act of performing a non-overlapping write of the third-to-last backup by performing the following:

for each of at least one data block that is represented in the third-to-last backup, but is not represented in either the second-to-last or the last backup, an act of writing the data block of the third-to-last backup to the non-volatile storage; and for each of at least one data block that is represented in the third-to-last backup, and is also represented in either or both of the second-to-last or the last backup, an act of refraining from writing the data block of the third-to-last backup.

5. A method in accordance with claim 4, wherein the last, second-to-last, and third-to-last backups are each incremental backups of the plurality of data blocks.

6. A method in accordance with claim 4, wherein the last and second-to-last backups are each incremental backups of the plurality of data blocks, and the third-to-last backup is a full backup of the plurality of data blocks.

7. A method in accordance with claim 6, further comprising:

an act of repeating the act of performing a non-overlapping write in reverse chronological order until the act of performing is performed for a full backup for the plurality of data blocks.

8. A method in accordance with claim 1, wherein the plurality of data blocks are each sectors, and the non-volatile storage is a disk drive.

9. A method in accordance with claim 1, further comprising:

an act of tracking which data blocks have been restored already as part of the restoration;

an act of identifying the at least one data block that is represented in the second-to-last backup, but is not represented in the last backup, using results of the act of tracking; and an act of identifying the at least one data block that is represented in the second-to-last backup, and is also represented in the last backup, using the results of the act of tracking.

10. A method in accordance with claim 9, wherein the act of tracking is performed using a bitmap with one bit for each of the plurality of data blocks representing whether or not the data block has already been restored as part of the restoration.

11. A method in accordance with claim 9, wherein the act of tracking is performed using a bitmap with one bit for each of one or more subranges of the plurality of data blocks.

12. A computer program product comprising one or more computer-readable storage media having thereon computer-executable instructions that, when executed by one or more processors of a computing system, cause the computing system to perform a method for restoring content of a plurality of data blocks to non-volatile storage as the content existed at a particular instant in time, the method comprising:

an act of accessing a last backup representing the most recent backup of the plurality of data blocks prior to the particular instant in time;

an act of writing the content of each data block represented in the last backup to a corresponding position in the non-volatile storage;

an act of accessing a second-to-last backup representing the second most recent backup of at least a portion of the plurality of data blocks prior to the particular instance in time; and after the act of writing the content of each data block represented in the last backup, an act of performing a non-overlapping write of the second-to-last backup by performing the following:

for each of at least one data block that is represented in the second-to-last backup, but is not represented in the last backup, an act of writing the data block of the second-to-last backup to the non-volatile storage; and for each of at least one data block that is represented in the second-to-last backup, and is also represented in the last backup, an act of refraining from writing the data block of the second-to-last backup.

13. A computer program product in accordance with claim 12, wherein the one or more computer-readable media are system memory.

14. A computer program product in accordance with claim 12, wherein the one or more computer-readable media are non-volatile storage.

15. A method for restoring content of a plurality of data blocks to non-volatile storage as the content existed at a particular instant in time, the method comprising:

an act of accessing a last backup representing the most recent backup of the plurality of data blocks prior to the particular instant in time, wherein the last backup is an incremental backup;

an act of writing the content of each data block represented in the last backup to a corresponding position in the non-volatile storage; and a step for non-redundantly restoring each preceding backup in reverse chronological order until a full backup corresponding to the incremental backup is restored.

16. A method in accordance with claim 15, wherein the step for non-redundantly restoring each preceding backup in reverse chronological order comprises:

an act of accessing a second-to-last backup representing the second most recent backup of at least a portion of the plurality of data blocks prior to the particular instant in time; and after the act of writing the content of each data block represented in the last backup, an act of performing a non-overlapping write of the second-to-last backup by performing the following:

for each of at least one data block that is represented in the second-to-last backup, but is not represented in the last backup, an act of writing the data block of the second-to-last backup to the non-volatile storage; and for each of at least one data block that is represented in the second-to-last backup, and is also represented in the last backup, an act of refraining from writing the data block of the second-to-last backup.

17. A computing system comprising the following:

a non-volatile storage comprising a plurality of data blocks;

one or more processors;

a restoration mechanism configured to perform a recovery method comprising:

an act of accessing a last backup representing the most recent backup of the plurality of data blocks prior to a particular instant in time;

an act of writing the content of each data block represented in the last backup to a corresponding position in the non-volatile storage;

an act of accessing a second-to-last backup representing the second most recent backup of at least a portion of the plurality of data blocks prior to the particular instant in time; and after the act of writing the content of each data block represented in the last backup, an act of performing a non-overlapping write of the second-to-last backup by performing the following:

for each of at least one data block that is represented in the second-to-last backup, but is not represented in the last backup, an act of writing the data block of the second-to-last backup to the non-volatile storage; and for each of at least one data block that is represented in the second-to-last backup, and is also represented in the last backup, an act of refraining from writing the data block of the second-to-last backup.

18. A computing system in accordance with claim 17, further comprising:

a memory having thereon computer-executable instructions that are structured such that when executed by the one or more processors, the recovery mechanism is caused to perform the recovery method.

19. A computing system in accordance with claim 18, wherein the memory is volatile system memory.

20. A computing system in accordance with claim 18, wherein the memory is non-volatile storage.

21. A method for backing up a plurality of data blocks, comprising:

creating a first backup of at least a portion of the plurality of data blocks, the first backup comprising a copy of at least a portion of the plurality of data blocks;

after creating the first backup, creating a second backup of at least a portion of the plurality of data blocks, the second backup comprising a copy of at least a portion of the plurality of data blocks;

identifying, by comparing the second backup with the first backup, one or more data blocks within the second backup that have been modified since creation of the first backup;

creating a file that identifies each data block within the second backup that has been modified since creation of the first backup, wherein the file identifies data blocks within the second backup that are to be restored in place of corresponding data blocks within the first backup during a reverse-chronological restore operation; and storing the file.

22. The method of claim 21, wherein the file comprises a bitmap that comprises at least one bit for each data block within the second backup that has been modified since creation of the first backup.

23. The method of claim 22, wherein the bitmap further comprises at least one bit for each of one or more subranges of the plurality of data blocks.

24. The method of claim 21, wherein the first backup is a full backup and the second backup is an incremental backup.

25. The method of claim 21, wherein the first backup is an incremental backup.

26. The method of claim 21, wherein the file enables restoring the second backup prior to restoring the first backup without performing substantial duplicative write operations.

27. A method for backing up a plurality of data blocks, comprising:

creating a first backup of at least a portion of the plurality of data blocks, the first backup comprising a copy of at least a portion of the plurality of data blocks;

after creating the first backup, creating a second backup of at least a portion of the plurality of data blocks, the second backup comprising a copy of at least a portion of the plurality of data blocks;

identifying, by comparing the second backup with the first backup, one or more data blocks within the second backup to be restored in place of corresponding data blocks within the first backup during a reverse-chronological restore operation;

creating a file that identifies each data block within the second backup that is to be restored in place of corresponding data blocks within the first backup during the reverse-chronological restore operation; and storing the file.

28. The method of claim 27, wherein the reverse-chronological restore operation comprises a restore operation in which the second backup is restored prior to restoring the first backup.

29. The method of claim 27, wherein the file further identifies each data block within the second backup that has been modified since creation of the first backup.

30. The method of claim 27, wherein the file comprises a bitmap that comprises at least one bit for each data block within the second backup that is to be restored in place of corresponding data blocks within the first backup during the reverse-chronological restore operation.

31. The method of claim 27, wherein the file comprises a bitmap that comprises at least one bit for each data block within the second backup that has been modified since creation of the first backup.

32. The method of claim 31, wherein the bitmap further comprises at least one bit for each of one or more subranges of the plurality of data blocks.

33. The method of claim 27, wherein the first backup is a full backup and the second backup is an incremental backup.

34. The method of claim 27, wherein the first backup is an incremental backup.

35. The method of claim 27, wherein the file enables restoring the second backup prior to restoring the first backup without performing substantial duplicative write operations.

36. A computer-readable storage medium, comprising:

a first computer-executable instruction operable to create a first backup of at least a portion of a plurality of data blocks, the first backup comprising a copy of at least a portion of the plurality of data blocks;

a second computer-executable instruction operable to create, after creating the first backup, a second backup of at least a portion of the plurality of data blocks, the second backup comprising a copy of at least a portion of the plurality of data blocks;

a third computer-executable instruction operable to identify, by comparing the second backup with the first backup, one or more data blocks within the second backup to be restored in place of corresponding data blocks within the first backup during a reverse-chronological restore operation;

a fourth computer-executable instruction operable to create a file that identifies each data block within the second backup that is to be restored in place of corresponding data blocks within the first backup during the reverse-chronological restore operation; and a fifth computer-executable instruction operable to store the file.

37. The computer-readable medium of claim 36, further comprising a fifth computer-executable instruction operable to identify each data block within the second backup that has been modified since creation of the first backup.

38. The computer-readable medium of claim 36, wherein the reverse-chronological restore operation comprises a restore operation in which the second backup is restored prior to restoring the first backup.

39. The computer-readable medium of claim 36, wherein the file comprises a bitmap that comprises at least one bit for each data block within the second backup that is to be restored in place of corresponding data blocks within the first backup during the reverse-chronological restore operation.

* * * * *